(12) United States Patent
Vreede

(10) Patent No.: US 10,793,203 B2
(45) Date of Patent: Oct. 6, 2020

(54) COMMERCIAL MOTOR VEHICLE

(71) Applicant: DAF Trucks N.V., Eindhoven (NL)

(72) Inventor: Robert Jacobus Vreede, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 183 days.

(21) Appl. No.: 16/021,223

(22) Filed: Jun. 28, 2018

(65) Prior Publication Data
US 2019/0002033 A1    Jan. 3, 2019

(30) Foreign Application Priority Data

Jun. 29, 2017 (NL) ...................................... 2019148

(51) Int. Cl.
*B62D 33/06* (2006.01)
*B62D 33/067* (2006.01)
*B62D 21/03* (2006.01)
*B62D 35/00* (2006.01)

(52) U.S. Cl.
CPC ......... *B62D 33/0604* (2013.01); *B62D 21/03* (2013.01); *B62D 33/067* (2013.01); *B62D 35/001* (2013.01)

(58) Field of Classification Search
CPC .. B62D 33/0604; B62D 33/067; B62D 21/03; B62D 35/001
USPC .................................................... 296/190.01
See application file for complete search history.

(56) References Cited

U.S. PATENT DOCUMENTS

| 2,306,348 | A | 12/1942 | Spear |
| 2,376,491 | A | 5/1945 | Kinney, Jr. |
| 3,642,316 | A | 2/1972 | Porth et al. |
| 3,972,557 | A | 8/1976 | Hudston et al. |
| 6,910,731 | B2 * | 6/2005 | Albright ............... B62D 33/067 180/89.16 |
| 7,338,114 | B2 * | 3/2008 | Ishii ....................... B62D 33/07 180/89.15 |
| 2009/0195022 | A1 * | 8/2009 | Bell ..................... B62D 33/067 296/190.06 |

FOREIGN PATENT DOCUMENTS

| DE | 43 41 693 A1 | 7/1994 |
| JP | H01226454 A | 9/1989 |
| WO | 2010/005346 A1 | 1/2010 |
| WO | 2014/196903 A1 | 12/2014 |

OTHER PUBLICATIONS

May 16, 2018—Dutch Search Report and Written Opinion, NL App No. 2019148.

* cited by examiner

*Primary Examiner* — Joseph D. Pape
*Assistant Examiner* — Dana D Ivey
(74) *Attorney, Agent, or Firm* — Banner & Witcoff, Ltd.

(57) ABSTRACT

A commercial motor vehicle having a chassis, an engine compartment defined between parallel elongate beams of the chassis, and a driver cabin positioned at least partially over the engine compartment. The driver cabin being supported on the chassis by spaced resilient suspension devices, and includes an upper cabin part and a lower cabin part. The upper cabin part is tiltable to allow access to the engine compartment by being hinged about a lower edge, while the lower cabin part remains associated with the chassis when the upper cabin part is tilted. The lower part of the driver cabin is supported by the resilient suspension devices.

7 Claims, 3 Drawing Sheets

COMMERCIAL MOTOR VEHICLE

CROSS-REFERENCE TO RELATED APPLICATIONS

This application claims priority to Dutch patent application NL 2019148, filed Jun. 29, 2017. Benefit of the filing date of this application under 35 U.S.C. § 119 is hereby claimed. This application is hereby incorporated by reference in its entirety.

TECHNICAL FIELD

The invention relates to a cab-forward type commercial motor vehicle having a chassis, an engine compartment defined between parallel elongate beams of the chassis, and a driver cabin positioned over the engine compartment, and supported on the elongate chassis beams.

BACKGROUND

Certain cabin arrangements on commercial vehicles are commonly referred to as being cab-over-engine (COE). The cab-over-engine arrangement has become very popular for commercial motor vehicles due to offering an increased payload length for the available chassis length.

Since the early 1940s it has become popular to offer tilting driver cabins on cab-forward type commercial vehicles to allow access to the engine compartment by pivoting the cabin from a front end of the chassis (U.S. Pat. Nos. 2,306,348 and 2,376,491).

In the interest of driver comfort it has also in more recent years become popular for the driver cabin to be supported on the chassis by spaced resiliently suspension devices, which results in relative movement between the cabin and the chassis (U.S. Pat. Nos. 3,642,316 and 3,972,557).

Also, in the interest of better aerodynamic properties, the exterior panels of driver cabins have amongst others become more enveloping with respect to wheel arches and parts of the chassis by the addition of valances extending downwardly from the cabin exterior. Because tilting truck cabins are hinged about a front pivot, enveloping parts of the cabin move about a relatively small radius and thereby risk interference with vehicle wheels or chassis mounted components, unless sufficient clearance is allowed for. However, from an aerodynamic point of view any larger than strictly necessary clearance is objectionable. One solution to this problem has been to provide an upper cabin part that is tiltable and a lower cabin part including the valances that is fixed to the chassis. For ease of reference this specification will uniformly refer to upper and lower cabin parts, whereas the lower cabin part may also include exterior panels that are not strictly associated with a cabin function, such as the valances, a front section carrying head lamps, mudguards or corner elements with or without steps. Affixing a lower cabin part, i.e. lower exterior panels, to the chassis has allowed the clearance with respect to vehicle wheels or chassis mounted components to be reduced at a minimum. It has, however also resulted in relative movement between the upper cabin part and the chassis mounted lower cabin part, c.q. lower exterior panels. To allow for this relative movement between upper and lower cabin parts a substantial intermediate gap is necessary in-between the upper and lower cabin parts. Not only does this necessary intermediate gap reduce the obtained aerodynamic benefits of the arrangement, but also it has become necessary to provide shielding means to reduce noise that escapes from the engine compartment (DE 43 41 693 and WO 2014/196903).

SUMMARY

To achieve minimum air drag it is preferred to have a very smooth outer skin associated with the cab structure, without unnecessary gaps or other disturbances. However cab spring travel and cab tilting usually conflict with this objective. As a result it has become common practice to have tiltable exterior cab panels and chassis fixed exterior panels that are separate from the tiltable cabin part.

Accordingly it is an object of the present invention to propose an improved commercial motor vehicle and cabin tilt arrangement, which eliminates the gap between upper and lower exterior panels, while still allowing spring travel and tilting. In a more general sense it is thus an object of the invention to overcome or reduce at least one of the disadvantages of the prior art. It is also an object of the present invention to provide alternative solutions which are less cumbersome in manufacture and operation, and which moreover can be made relatively inexpensively. Alternatively it is an object of the invention to at least provide a useful alternative.

To this end the invention provides for a commercial motor vehicle as defined in one or more of the appended claims. The commercial motor vehicle of the invention usually can have a chassis, an engine compartment defined between parallel elongate beams of the chassis, and a driver cabin at least partially positioned over the engine compartment. The driver cabin can be supported on the chassis by spaced resilient suspension devices, and can include an upper cabin part that is tiltable to allow access to the engine compartment by being hinged about a lower edge, and a lower cabin part that remains associated with the chassis when the upper cabin part is tilted. In particular the lower part of the driver cabin can be supported by the resilient suspension devices. In such an arrangement the lower cabin part that includes downwardly extending valances enveloping the wheel arches, or like lower exterior paneling, will only interfere with vehicle wheels or chassis mounted components to the extend of their suspension movements with respect to the chassis. By mounting lower exterior panels to a sub frame in such a manner that during driving it moves together with the upper exterior panels of the cab, and during tilting does not interfere with wheels it is ensured that in driving mode there are no gaps between the upper and lower exterior panels. Any clearance that needs to be provided between wheels and valances, or like is substantially smaller than would be necessary for allowing tilting movement of the lower exterior panelling. On the other hand no clearance is required, and is indeed fully eliminated between upper and lower cabin parts, when these are connected to one another in the non-tilted (driving mode) position of the upper cabin part. In the motor vehicle according to the invention the spaced resilient suspension devices can include a pair of forward spring elements operatively interposed between the chassis and the upper and lower cabin parts, and the tiltable upper cabin part can be pivotally hinged to upper ends of the pair of forward spring elements. While conventionally there are parts that are either chassis fixed or cabin fixed, the present invention now introduces a third option, i.e. a floating suspension of non-tiltable cabin parts. Thereby only minimal means are necessary to achieve that all parts important to the aerodynamics when driving are connected substantially seamless, without hindering the suspension movements of the cabin with respect to the chassis. When the tiltable cabin part is tilted, the lower non-tiltable part cannot conflict with the wheels or other chassis connected parts, which benefits ease of tilting.

In one embodiment the spaced resilient suspension devices can also include a pair of rearward spring elements that are operatively interposed between the chassis and the upper and lower cabin parts, and the tiltable upper cabin part can be releasably latched to upper ends of the pair of rearward spring elements. Accordingly a floating suspension has been obtained by using the four spring elements that are already present. By simply connecting the subframe at specific locations to the existing structure, without hindering driving movements and tilting movements, and merely requiring an addition to already existing components.

In another embodiment the lower cabin part can include a sub frame that is attached to the spaced resilient suspension devices. Additionally or alternatively the sub frame can be a tubular frame. When a sub frame is included it can also include front and rear lugs, in which case at least one front lug can be connected to a suspended upper portion of a forward one of the spaced suspension devices, and at least one rear lug can be connected to a suspended upper portion of a rearward one of the spaced suspension devices.

In yet another embodiment the lower edge about which the upper cabin part is hinged is advantageously a front lower edge.

BRIEF DESCRIPTION OF THE DRAWINGS

Further advantageous aspects of the invention will become clear from the appended description and in reference to the accompanying drawings, in which.

DETAILED DESCRIPTION

Figure 1:
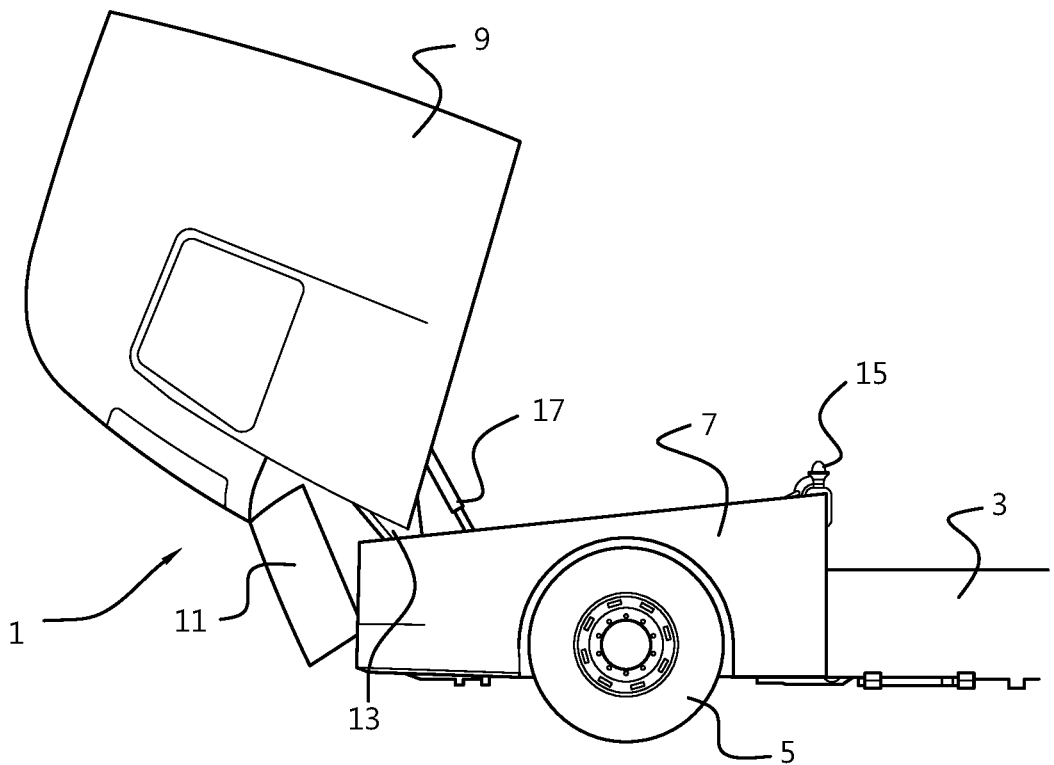
FIG. 1 is a partial side elevation of a commercial motor vehicle with an upper cabin part shown in tilted position.

As shown in the partial side elevation of FIG. 1, a commercial motor vehicle, such as a truck 1 has a chassis 3, a front wheel 5, and lower and upper cabin parts 7, 9. The upper cabin part 9 may also have a hinged front inspection panel 11, which is hinged to clear the lower cabin part 7, when the upper cabin part 9 is tilted about front hinge 13 as shown in FIG. 1. The front inspection panel 11 may also itself be hinged to provide limited access to serviceable components when the upper cabin part 9 is in a lowered, non-tilted, position on the chassis 3. To obtain a tilted position of the upper cabin part 9, one or more rearward latches 15 can be disengaged while a powered actuator 17 provides for the tilting movement of the upper cabin part 9.

Figure 2:
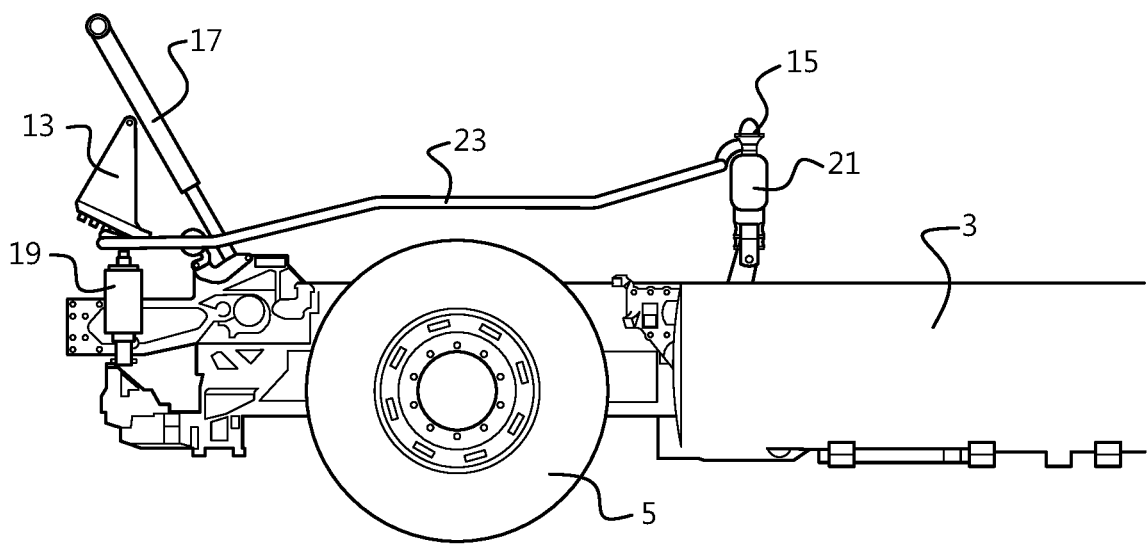
FIG. 2 is a partial side elevation similar to FIG. 1, but with the cabin parts removed to reveal internal structure.

As shown in the partial side elevation of FIG. 2, with the upper and lower cabin parts deleted for clarity, the front hinge 13 is associated with one or more forward spring elements 19. Also shown in FIG. 2 is that the one or more rearward latches 15 are associated with one or more rearward spring elements 21. The forward and rearward spring elements 19, 21 are connected to and resiliently supporting a sub frame 23.

Figure 3:
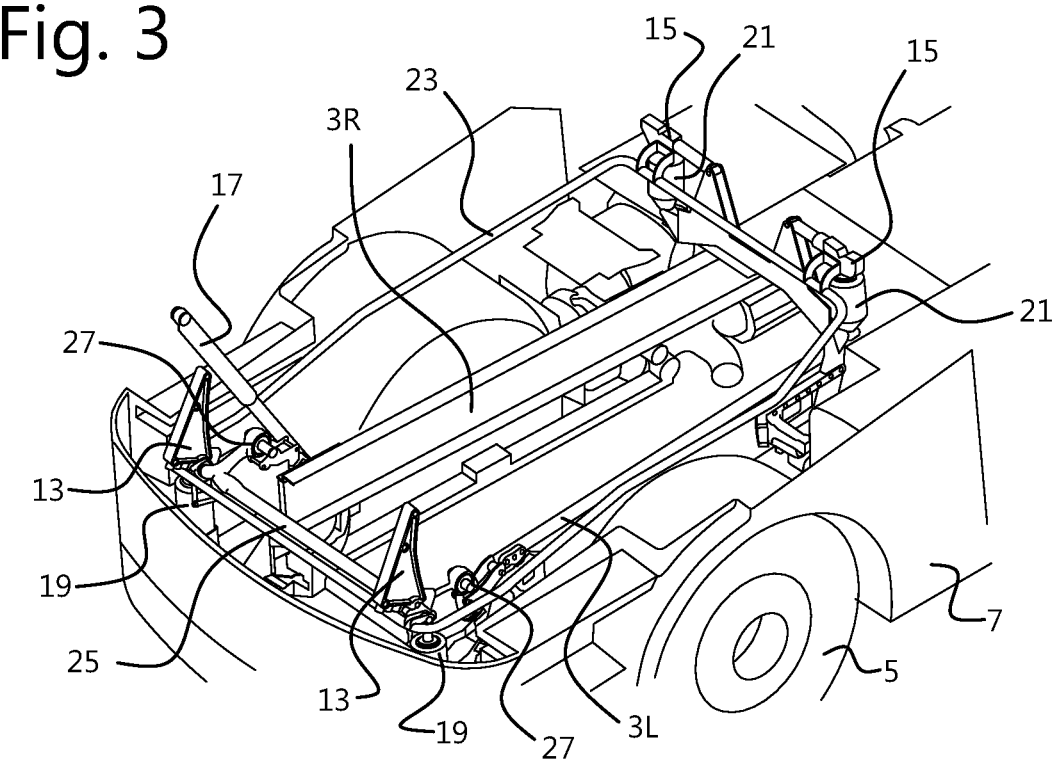
FIG. 3 is an isometric partial view of the commercial motor vehicle of FIG. 1 with the lower cabin part in position, but without the upper cabin part to show the resilient suspension devices with hinges and an actuator in the position for a tilted upper cabin part.
Figure 4:
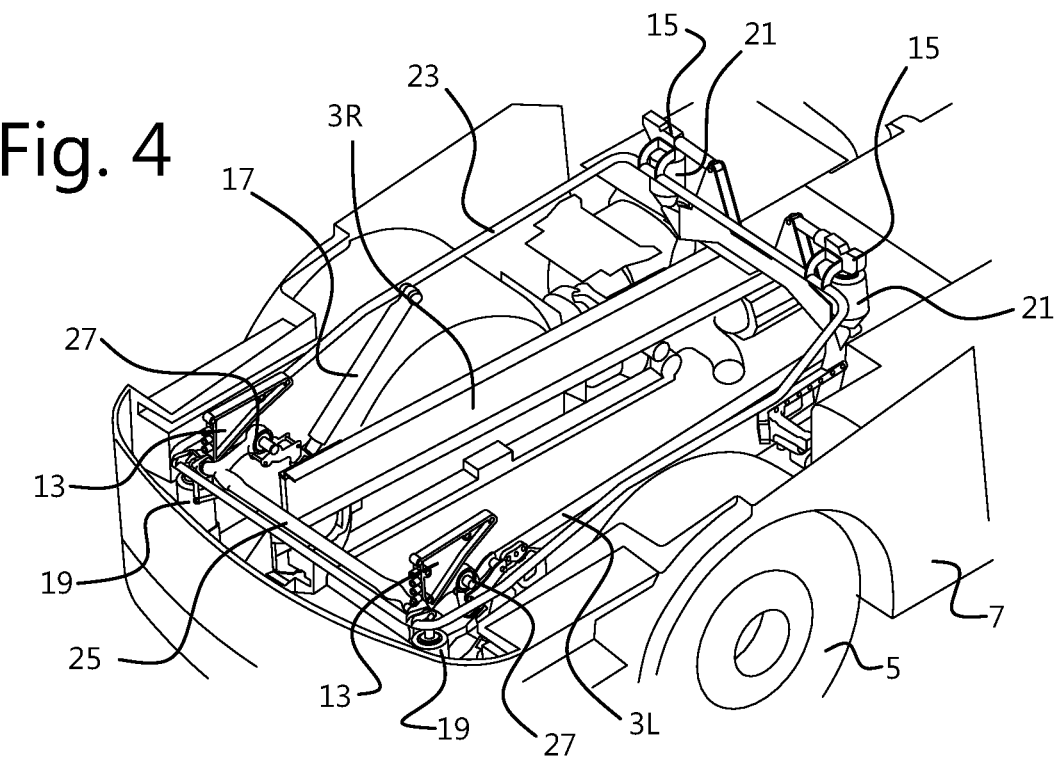
FIG. 4 is an isometric view similar to FIG. 3, but with the hinges and actuator in position for a lowered upper cabin part.

As will be apparent from FIGS. 3 and 4 the chassis comprises parallel elongate right-hand and left-hand chassis beams 3R, 3L. Conventionally an engine compartment is defined between the parallel elongate beams 3R, 3L, which in normal use is at least partially covered by the upper cabin part 9. Each of the right-hand and left-hand chassis beams 3R, 3L has extensions at its front end to carry, in this example, a pair of right-hand and left-hand forward spring elements 19. A torsion rod 25 is provided to pivotally link the front hinges 13 to an upperpart of the forward spring elements 19 and both of these with a pivot link 27 associated with a respective one of the chassis beams 3R, 3L. The lower cabin part 7 has no connection with the chassis beams 3L, 3R, but instead is affixed to the sub frame 23 by conventional means (not shown). As such when the upper cabin part 9 is in its lowered position and locked by the latches 15, the upper and lower cabin parts 9, 7 form a single mass spring system with the forward and rearward spring elements 19, 21. The spring elements 19, 21 can be combined with shock absorbers in a manner known to the skilled person.

Figure 5:
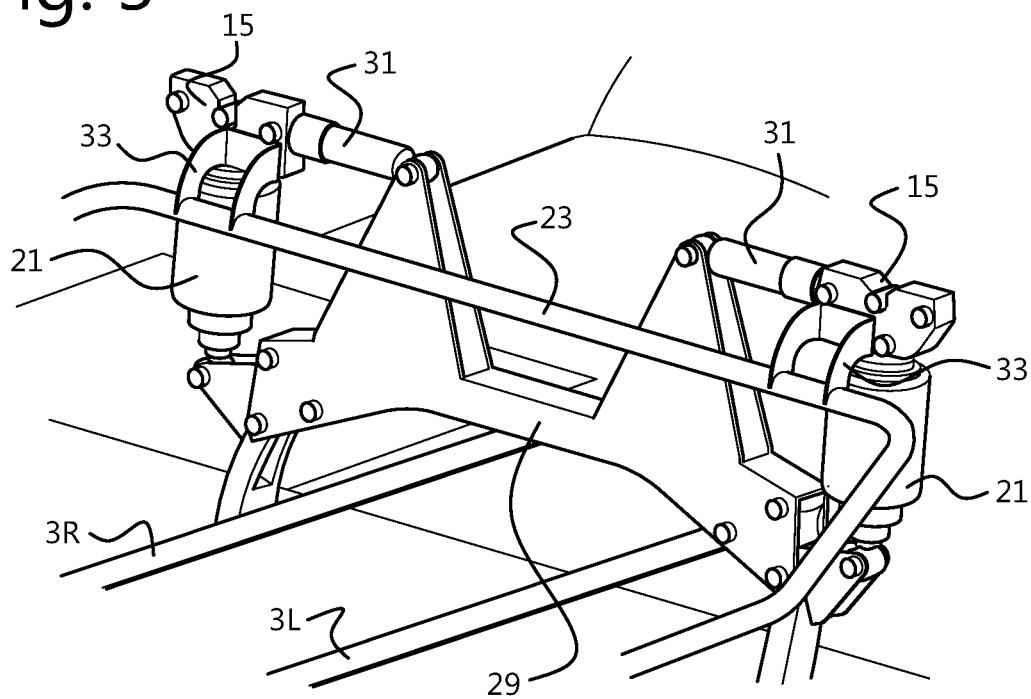
FIG. 5 is an enlarged isometric detail view of rearward spring elements and their connection to a lower cabin part sub frame.

As shown in FIG. 5 in more detail the rearward spring elements 21, and latches 15 are mounted on a traverse bridge 29. In a lateral direction the latches 15 on top of the rearward spring elements 21 are pivotally connected to the traverse bridge 29 by shock absorbing units 31, which have a limited stroke of about 20 mm. Thereby the latches 15 are suspended from the chassis 3R, 3L, and the sub frame 23 is connected by rear lugs 33 to the suspended latches 15.

Figure 6:
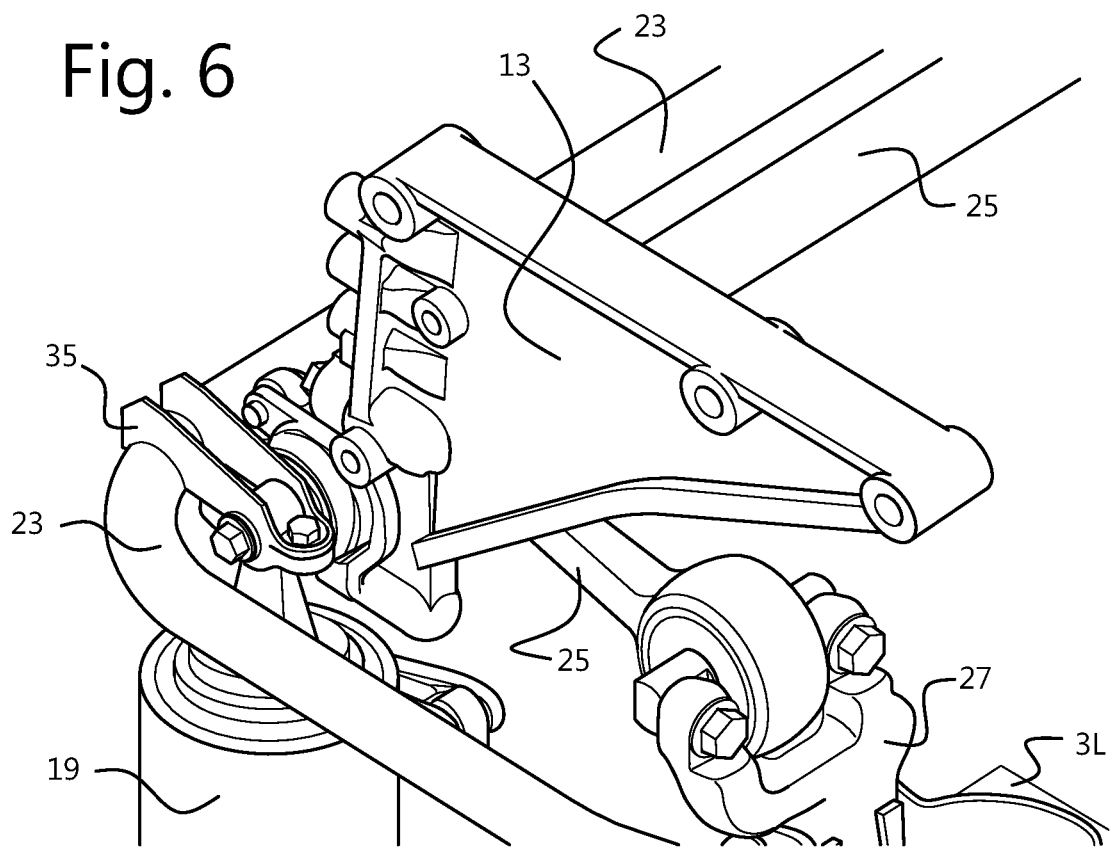
FIG. 6 is an enlarged isometric detail view of a forward spring element and its connection to the lower cabin part sub frame and upper cabin part hinge.

FIG. 6 shows in greater detail the arrangement of the upper cabin part front hinge 13 with respect to the forward spring element 19 and the torsion rod 25. Also at the front of the driver cab the sub frame 23 is connected to the suspended pivot point of the front hinge 13 by a front lug 35.

Accordingly an example is described of a commercial motor vehicle 1 that has a chassis 3, an engine compartment defined between parallel elongate beams 3R, 3L of the chassis, and a driver cabin 7, 9 positioned at least partially over the engine compartment. The driver cabin 7, 9 being supported on the chassis 3 by spaced resilient suspension devices 19, 21, and includes an upper cabin part 9 and a lower cabin part 7. The upper cabin part 9 is tiltable to allow access to the engine compartment by being hinged about a lower edge, while the lower cabin part 7 remains associated with the chassis 3 when the upper cabin part 9 is tilted. The lower part 7 of the driver cabin 7, 9 is supported by the resilient suspension devices 19, 21.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A commercial motor vehicle having a chassis, an engine compartment defined between parallel elongate beams of the chassis, and a driver cabin at least partially positioned over the engine compartment, the driver cabin being supported on the chassis by spaced resilient suspension devices, and includes an upper cabin part that is tiltable with respect to the chassis to allow access to the engine compartment by being hinged about a lower edge and a lower cabin part that is non-tiltable with respect to the chassis and that remains associated with the chassis when the upper cabin part is tilted, wherein the lower cabin part of the driver cabin is supported by the resilient suspension devices.

2. The commercial motor vehicle of claim 1, wherein the spaced resilient suspension devices include a pair of forward spring elements operatively interposed between the chassis and the upper and lower cabin parts, and wherein the tiltable upper cabin part is pivotally hinged to upper ends of the pair of forward spring elements.

3. The commercial motor vehicle of claim 1, wherein the spaced resilient suspension devices include a pair of rearward spring elements operatively interposed between the chassis and the upper and lower cabin parts, and wherein the tiltable upper cabin part is releasably latched to upper ends of the pair of rearward spring elements.

4. The commercial motor vehicle of claim 1, wherein the lower cabin part includes a sub frame that is attached to the spaced resilient suspension devices.

5. The commercial motor vehicle of claim 4, wherein the sub frame is a tubular frame.

6. The commercial motor vehicle of claim 4, wherein the sub frame includes front and rear lugs, wherein at least one front lug is connected to a suspended upper portion of a forward one of the spaced suspension devices, and wherein at least one rear lug is connected to a suspended upper portion of a rearward one of the spaced suspension devices.

7. The commercial motor vehicle of claim 1, wherein the lower edge about which the upper cabin part is hinged is a front lower edge.

\* \* \* \* \*